United States Patent [19]

Ogushi et al.

[11] Patent Number: 4,978,973

[45] Date of Patent: Dec. 18, 1990

[54] THERMAL PRINTER

[75] Inventors: Akira Ogushi; Hisashi Uemura, both of Hyogo, Japan

[73] Assignee: Kanzaki Paper Mfg. Co., Ltd., Japan

[21] Appl. No.: 448,236

[22] Filed: Dec. 11, 1989

[51] Int. Cl.[5] .............................................. G01D 15/10

[52] U.S. Cl. ................................ 346/76 PH; 400/120

[58] Field of Search ..................... 346/76 PH; 400/120

[56] References Cited

U.S. PATENT DOCUMENTS 4,738,553 4/1988 Uemura et al. ................ 346/76 PH 4,844,631 7/1989 Feron et al. .................... 346/76 PH

FOREIGN PATENT DOCUMENTS 0064480 4/1986 Japan .

*Primary Examiner*—Bruce A. Reynolds

*Assistant Examiner*—Huan Tran

*Attorney, Agent, or Firm*—Stevens, Davis, Miller & Mosher

[57] ABSTRACT

A thermal printer including a line thermal head having heating elements, comprises trays for receiving thermal sensitive cut papers, a plurality of rollers for feeding the papers from the trays to the thermal head, and an electric power supply for supplying electric power to the heating elements.

The thermal printer also includes a controller for controlling the power supply from the electric power supply in response to the size of the selected papers.

2 Claims, 1 Drawing Sheet

THERMAL PRINTER

BACKGROUND OF THE INVENTION

The present invention relates to a thermal printing apparatus for using a line thermal head.

In a conventional thermal printing apparatus for using a line thermal head, since a printing width is kept constant and a continuous thermal sensitive paper is used in correspondence with the printing width, the waste of the thermal sensitive paper sometimes increases according to a size of the original. To reduce this waste of the paper, various sizes of the separated papers may be used. However, there are the following problems. There has been no thermal printer having a line thermal head that can use several sizes of thermal sensitive papers.

In the line thermal head, in accordance with a content of the original or an output signal of the printing pattern, it is determined which element should be heated. Therefore, if a piece of cut paper is used and a size of the paper is selected in error, the width of printing pattern often becomes larger than expected. In this case, the heating elements which are located outside of the printing width of paper are also heated. Even if the size of paper is selected correctly, it is often happened that the width of the printing pattern is as long as the width of paper and the whole position of the printing pattern signal is slightly offset in the lateral direction In this case, the heating elements located outside of the paper width are also heated.

Thus, if the heating elements are heated without the thermal sensitive paper under the elements, the elements are heated over. Further, if the elements are heated over repeatedly, the elements are likely to be damaged or broken down. Some heating elements which are located near to the edges of the paper would be subjected to the above-mentioned "idle-heating". Further, if the heating elements which are located close to the edges of paper are repeatedly idle-heated in the thermal head, the heating elements are readily damaged to form a blank line on the printed surface in the longitudinal direction.

In this case, it is very difficult to replace only the broken and damaged elements of the line thermal head by new ones. Accordingly, the whole head must be exchanged by new head. Therefore, although the waste of paper is reduced, the cost of maintenance is increased. Also, in the case of using cut paper, before the leading edge of the paper passes under the thermal head or after the trailing edge of the paper passes under the thermal head, there would be fear that the printing signal would be inputted into a control means so that the heating elements would be accidentally subjected to idle heat.

SUMMARY OF THE INVENTION

The present invention provides a thermal printer including a line thermal head. Accordingly, an object of this invention is to provide a line thermal head which can be selected and used with a plurality of sizes of cut paper without any fear that the service life of the thermal head would be shortened.

This and other objects are attained by providing a thermal printer including a line thermal head having heating elements, comprising: means for receiving thermal sensitive cut papers having a plulality of sizes; means for selectively feeding papers from the receiving means to the thermal head; electric power supply means for supplying electric power to the heating elements; and control means for controlling the power supply from the electric power supply means in response to a size of the selected papers, the control means including a first means for preventing the power supply to a part of the heating elements located in a predetermined width on each side of said line thermal head in response to a width of the selected papers whereby any waste idle heat of said heating elements may be avoided.

When continuous thermal sensitive paper is used, the paper is prepared below the thermal head. Therefore, even if a printing signal of the thermal head is inputted or interrupted, there is no problem that the heating elements are idle-heated during the operation of the printer.

When cut papers is used, the paper is not previously prepared below the thermal head. After the paper passes through the thermal head, there is no paper below the thermal head. Therefore, the heating elements are idle-heated by flowing the current to the thermal head until the paper is fed below the thermal head from the commencement of the operation of the printer to the feeding operation thereof. After the paper as a whole has passed through the thermal head, the heating elements are also idle-heated by the electric current through the thermal head.

In the present invention, the paper is detected at the inlet side of the line thermal head and the line thermal printer prevents the current from flowing through the line thermal head before a lapse of a predetermined time lag from a time when a detection signal has been generated. Therefore, there is no problem that the heating elements are idle-heated. In the same way, with respect to the trailing edge of the paper, since the thermal printer prevents a current from flowing through the thermal head after another predetermined time lag from a time when the detection signal has been terminated.

With respect to the width of the paper, the thermal printer prevents the current from flowing the certain width of the line thermal head by the signal which is generated by the operation of size designation in accordance with the width of paper. Therefore, there is no problem that the heating elements would be idle-heated, even if the width of the printing pattern is wider than the width of the paper.

DESCRIPTION OF THE PREFERRED EMBODIMENTS

Figure 1:
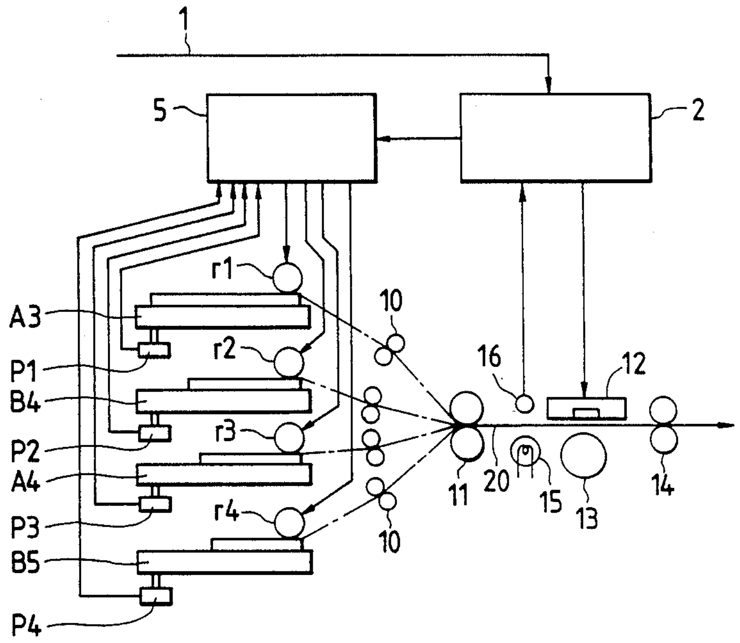
FIG. 1 is a diagram showing a thermal printer according to an embodiment of the present invention.

FIG. 1 shows a whole system of a thermal printer according to one embodiment of the present invention. In FIG. 1, reference characters A3, A4, B4, and B5 are representative of various sizes of trays for receiving thermal sensitive cut papers. The trays are inserted into shelves provided in a printer body. Papers A3, A4, B4, and B5 are received in the trays A3, A4, B4 and B5, respectively.

Reference characters P1, P2, P3 and P4 indicate limit switches for detecting sizes of the trays inserted in the printer body. If the tray is inserted into the printer body, the associated limit switch is turned on. Feeding rolls r1, r2, r3 and r4 are each provided in contact with a printing surface of the thermal sensitive paper received in each tray. The feeding rolls are operated, respectively, by a signal fed from a control unit 2 (later described) for feeding papers.

A pair of nip rolls 10 are provided in the middle of the paper feed path from each tray to the printing position. The nip rolls 10 are provided to operate at once.

A pair of the nip rolls 11 are commonly used for each size of paper. The nip rolls 11 are provided on an inlet side of the paper to the printing position.

A printing unit includes a line thermal head 12, and a platen roll 13. The line thermal head 12 is normally lifted away from the platen roll 13. The line thermal head 12 is driven so that the head 12 is lowered only when the paper passes below the head 12.

A pair of nip rolls 14 are used for discharging the paper. The paper is fed along a paper path 20. A light emitting element 15 and a light receiving element 16 are provided between the nip rolls 11 and platen roll 13. The light emitting element 15 and light receiving element 16 are provided to face each other across the passage 20 so as to detect the existence of the paper.

A cable 1 is used for interconnecting a computer and a printer to each other. A computer (not shown) applies signals of the printing pattern. The control unit 2 is used to select one signal for designating the size of the paper and the other signal for a printing pattern image in accordance with the signals fed from the computer. Both kinds of the signals are restricted by the computer so that the size designation signal is first outputted and subsequently the image signal is outputted therefrom. The control unit 2 serves to select the size designation signal, to judge the designated size, to store it, to feed a suitable signal to a paper feed control unit 5, to temporarily drive the feed roll (any one of rolls r1 to r4) corresponding to the signal sensitive paper where the paper reaches the nip roll 10.

All of the nip rolls 10, 11, and 14 are simultaneously rotated and the thermal sensitive paper is fed until the paper is discharged by the nip rolls 14. During this operation, when the paper has passed below the element 16, the incident light is blocked off by the paper so that the light receiving element 16 outputs the signal for detecting the paper. The control unit 2 detects an initial rise of the blocking signal. After the predetermined time lag longer than required for the leading edge of the thermal sensitive paper to enter between the thermal head 12 and the platen roller 13, the thermal head 12 is lowered so that the signal is fed to the computer to allow the issuance of the print pattern image signal from the computer. Thereafter, the image signal is sent from the computer so that the thermal head is energized to start the printing operation.

When the trailing edge of the paper has passed below the light receiving element 16, no signal for detecting the paper is issued. When this state is detected by the control unit 2, after a predetermined time lag the image signal issuance is stopped to interrupt the energization of the thermal head 12. If the printing is continued, the signal for continuing the printing is sent from the computer. The control unit 2 operates to repeat the above-mentioned operation in accordance with the signal which is sent from the computer.

Figure 2:
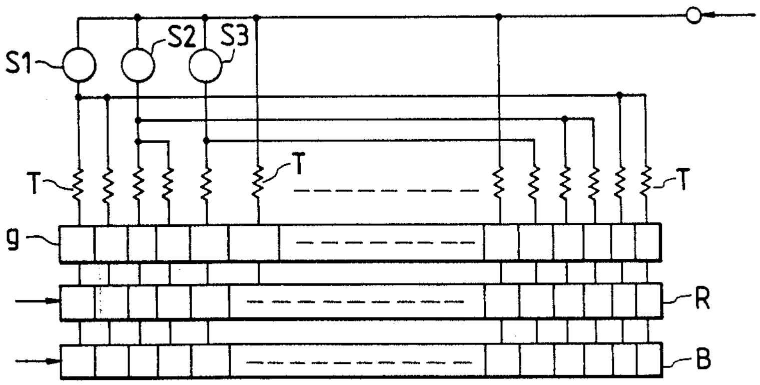
FIG. 2 is a circuit diagram showing the primary portion of the embodiment.

FIG. 2 shows a circuit for setting a heating preventing zone for preventing the thermal head from being heated at both end portions. Reference character T shows respective heating elements each of which is connected to one thermal of a power source through a gate element g. A number of heating elements which are arranged in the unit portion of the width of the to be-used paper having the smallest size are connected directly to the other terminal of the power source. All the of the elements of both the sides of the thermal head are divided into several groups and are connected in the last-mentioned terminal of the power source through the switch elements S1 to S3 of every group. Reference character B shows a buffer register picking up image signal for one line. A latch circuit R reads the output of the buffer register B by reading pulses. The gate elements g are opened or closed in accordance with the signal of the image. As a result, the current flows to the predetermined heating elements. If the control unit 2 selects and judges the signal for designating the size, switch elements are selectively turned on according to the designated size. For example, if the size is A3, the current flows through all the switches S1 to S3, if the size is B4, the current is shut off only by switch S1, if the size is A4, the current is shut off by switches S1 and S2, and if the size is B5, the current is shut off by all the switches S1 to S3. Such a selected ON/OFF condition is held until a series of the printing operations have been finished.

According to the above of the present invention the tray A3, A4, B4, and B5 can be inserted into the same portion of the printer body as desired. Therefore, the apparatus can be made compact. In this case, a limit switch is available for feeding a suitable signal of the paper size.

In the prior art, a continuous thermal sensitive paper has been used by the printer having a line thermal head. Therefore, the size of the printing pattern often does not correspond to the size of paper to increase the waste paper. However, according to the present invention, the cut paper can be used, since the size of the paper can be selected in accordance with the size of the printing pattern. Therefore, the waste paper can be decreased. It is therefore possible to reduce the maintenance cost for the printer without any fear that the service life of the thermal head would be shortened.

What is claimed is:

1. A thermal printer including a line thermal head having heating elements, comprising:
   - means for selectively feeding one of said papers from said receiving means to said thermal head;
   - electric power supply means for supplying electric power to said heating elements; and
   - control means for controlling said electric power supplied from said electric power supply means in response to a size of the selected paper, said control means including a first means for preventing said electric power from being supplied to a part of said heating elements located in a predetermined width on each side of said line thermal head in response to a width of the selected paper;
   - a detector means for detecting said selected paper, said detector means being provided on an inlet side of said line thermal head and for generating a detection signal for a predetermined period of time, and
   - a second means for preventing said electric power from being supplied to all said heating elements of said thermal head before a lapse of a predetermined time lag from a time when said detection signal has been generated and after another predetermined time lag from a time when said detection signal has been terminated;

whereby any waste idle heat of said heating elements may be avoided.

2. The thermal printer according to the claim 1, wherein said detector means includes a light source and an optical sensor, said light source and said optical sensor being provided facing each other across a path conveying said paper.

* * * * *